(12) United States Patent  (10) Patent No.: US 11,604,110 B2
Wagner  (45) Date of Patent: Mar. 14, 2023

(54) LEADLESS PRESSURE SENSOR

(71) Applicant: Silicon Microstructures, Inc., Milpitas, CA (US)

(72) Inventor: Chris Wagner, San Jose, CA (US)

(73) Assignee: MEASUREMENT SPECIALTIES, INC, Hampton, VA (US)

( * ) Notice: Subject to any disclaimer, the term of this patent is extended or adjusted under 35 U.S.C. 154(b) by 86 days.

(21) Appl. No.: 16/734,229

(22) Filed: Jan. 3, 2020

(65) Prior Publication Data

US 2020/0284677 A1    Sep. 10, 2020

Related U.S. Application Data

(60) Provisional application No. 62/814,268, filed on Mar. 5, 2019.

(51) Int. Cl.
*G01L 19/14* (2006.01)
*G01L 13/02* (2006.01)
*G01L 9/02* (2006.01)
*G01L 9/00* (2006.01)

(52) U.S. Cl.
CPC .......... *G01L 9/0051* (2013.01); *G01L 13/025* (2013.01); *G01L 19/142* (2013.01)

(58) Field of Classification Search
CPC ....... G01L 13/00; G01L 13/02; G01L 13/025; G01L 19/14; G01L 19/142; G01L 19/143; G01L 19/144; G01L 19/147; G01L 19/148

See application file for complete search history.

(56) References Cited

U.S. PATENT DOCUMENTS

| | | | | |
|---|---|---|---|---|
| 4,520,748 | A * | 6/1985 | Frano | B01D 46/10 116/70 |
| 2008/0027332 | A1* | 1/2008 | Bradley | A61B 5/6874 600/485 |
| 2013/0055821 | A1* | 3/2013 | Bentley | G01L 9/0054 73/721 |
| 2018/0149538 | A1* | 5/2018 | Gritti | G01L 9/08 |
| 2018/0343745 | A1* | 11/2018 | Larson | H05K 1/111 |
| 2019/0078914 | A1* | 3/2019 | Doering | G01F 1/44 |
| 2019/0127218 | A1* | 5/2019 | Ghidoni | B81B 7/0061 |

OTHER PUBLICATIONS

Partial European Search Report, European Application No. 20161126. 6-1001, European Filing dated Jul. 21, 2020.

(Continued)

*Primary Examiner* — Herbert K Roberts

(57) ABSTRACT

Pressure sensor systems that include a pressure sensor die and other components in a small, space-efficient package, where the package allow gas or liquid to reach either or both sides of a membranes of the pressure sensor die. A package can include a substrate and a cap, where either or both the substrate and the cap divide the package internally into two chambers. The substrate can have a solid bottom layer, a middle layer having a slot or path running a portion of the length of the layer, and a top layer having two through-holes that provide access to the slot or path. The cap can have two ports. A first port can lead to a first chamber where a top side of a pressure sensor is in the first chamber. A second port can lead to a second chamber and the slot or path, where the slot or path leads to a bottom side of the pressure sensor.

13 Claims, 17 Drawing Sheets

(56) References Cited

OTHER PUBLICATIONS

HTD Series—Digital Differential Pressure Sensors, Data Sheet [online], First Sensor, [retrieved on Jan. 10, 2020], Retrieved from the Internet: <URL: https://www.first-sensor.com/cms/upload/datasheets/DS_Standard-HTD_E_11824.pdf>; 14 pages.

Piezoresistive manifold HTD low pressure sensors from 1 mbar, YouTube Video, First Sensor, Nov. 13, 2017, [online], [retrieved on Jan. 10, 2020]. Retrieved from the Internet <URL: https://www.youtube.com/watch?v=zVuoSgyqBNQ&feature=emb_logo>, 1 page.

HTD Amplified Pressure Sensors, Data Sheet [online], First Sensor, [retrieved on Jan. 10, 2020], Retrieved from the Internet: <URL: https://www.first-sensor.com/en/products/pressure-sensors/amplified-pressure-sensors/htd/>, 4 pages.

Flow and Pressure Measurement in Respiratory Medical Equipment SM9000 and SM6000, YouTube Video, Silicon Microstructures, Inc., May 22, 2017, [online], [retrieved on Dec. 20, 2019], Retrieved from the Internet <URL: https://www.youtube.com/watch?time_continue=2&v=ixWh0bJysVw&feature=emb_logo>, 1 page.

Low Pressure Digital Sensor M6X21 Series, Datasheet, Silicon Microstructures, Inc., 2016, 11 pages.

\* cited by examiner

LEADLESS PRESSURE SENSOR

CROSS-REFERENCES TO RELATED APPLICATIONS

This application claims priority to U.S. provisional application No. 62/814,268, filed Mar. 5, 2019, which is incorporated by reference.

BACKGROUND

Pressure sensors have become ubiquitous the past few years as they have found their way into many types of products. Utilized in automotive, industrial, consumer, medical products, and other industries, the demand for pressure sensors has skyrocketed and shows no signs of abating.

With this large number of various and divergent uses comes a wide variety of package requirements. Different types of packages have been developed for pressure sensor systems, some of which are based on standard packages, such as dual in-line pin (DIP) and small-outline integrated circuit (SOIC) packages.

These packages can leverage existing assembly equipment. This can allow these packages to be used in high-volume applications. But along with these high volumes comes a consistent drive to reduce the cost and size of these packages. Accordingly, for some applications, it can be desirable that a pressure sensor system be space-efficient. For example, it can be desirable that the pressure sensor system be housed in a small package that consumes a reduced amount of board space.

A pressure sensor system can include a pressure sensor die as well as other components. A pressure sensor die can include a diaphragm or membrane that can support a Wheatstone bridge or other pressure-sensitive structure, where the membrane is at least partially supported by a thicker frame portion. A pressure sensor die can be housed in a package that allows gas or liquid to reach one or both sides of the membrane. This can enable pressure sensor systems that can be implemented in absolute, gauge, or differential pressure sensor configurations. The pressure from the gas or liquid can cause the membrane to change shape, thereby inducing a change in the pressure-sensitive structure. This change can then be measured to determine a net pressure on the membrane.

Thus, what is needed are pressure sensor systems that include pressure sensor dice and other components in small, space-efficient packages, where the packages allows gas or liquid to reach either or both sides of the membranes of the pressure sensor dice.

SUMMARY

Accordingly, embodiments of the present invention can provide pressure sensor systems that include pressure sensor dice and other components in small, space-efficient packages, where the packages allows gas or liquid to reach either or both sides of the membranes of the pressure sensor dice.

An illustrative embodiment of the present invention can provide a pressure sensor system that includes a package having a layered structure as a mounting substrate. This substrate can include or support electrical traces for electrical interconnection among a pressure sensor die, other components, and circuitry external to the pressure sensor system. This substrate can eliminate the need for terminal leads on the package, thus saving space and cost. The pressure sensor system package can further include a cap that can be attached to the substrate, where the cap allows a membrane of the pressure sensor die to be pressurized from the either the top side, bottom side, or both sides. Various caps having different ports can be attached to the substrate. This provides flexibility and allows the pressure sensor system to be configured in absolute, gauge, or differential configurations.

These and other embodiments of the present invention can provide a package substrate having a layered structure, or board, that supports a pressure sensor die as well as any required conditioning electronics, such as an application-specific integrated circuit (ASIC) and other passive or active components. This substrate can be composed of different cores or layers that are fused together using adhesives materials. The cores or layers can be composed of a printed circuit board material such as FR4, ceramic, silicon, plastic, or other material. These and other embodiments of the present invention can provide a three layer substrate. The substrate can have a solid bottom layer, a middle layer having a slot or path running a portion of the length of the layer, and a top layer having two through-holes. These cores or layers can be laminated together so that the two through-holes in the top layer are near the ends of the slot or path in the middle layer. The slot or path can be substantially straight, or it can be curved or have another shape, for example to avoid or simplify trace routing in the substrate. The slot or path can be widened at one or both ends in a dog-bone configuration to simplify the alignment of the two through-holes. The resultant substrate has a passage to channel pressure media (such as a gas or liquid) by allowing it to enter a first through-hole, travel the length of the slot or path, and exit a second through-hole. The substrate can also have electrical traces and pads.

These pressure sensor system packages can be constructed by mounting a pressure sensor over one though-hole of the substrate using an adhesive that retains the die and seals around the through-hole between the pressure sensor and substrate, where the adhesive does not obstruct the pressure passage of the substrate. The pressure sensor can then be connected to traces on, in, or supported by the substrate. These traces can convey electrical inputs and outputs among the other electrical components in the pressure sensor system package and circuits external to the pressure sensor system. Protective materials, such as coatings, gels, potting materials, or other substances, can be applied to the pressure sensors and other electrical components.

A cap having one or more ports can be adhesively or otherwise attached to the substrate. Features of the cap, substrate, or both the cap and substrate can be used to separate an interior of the pressure sensor system into two or more chambers. A first chamber can extend over the pressure sensor die. A separate second chamber can connect to a passage in the substrate, where the passage has an opening under the pressure sensor die. Conditioning electronics, if any, can be in either chamber. The one or more ports can each have at least one opening, where an opening leads to one of the separated chambers. The openings in the ports can be on the top of the ports, on a side of the ports, or a combination of both. An outside of each port can have a feature, such as a nozzle, that mates with a manifold or tube to form a connection to a pressure source or the ambient atmosphere. These nozzles can be smooth, barbed, or have some other form. A port opening can go through this feature allowing pressure to enter the pressure sensor package. The pressure can be routed through the substrate to the back of the die or can go to the chamber over the top of the die.

The electrical signals can be routed to the exterior of the package by traces on or in the substrate. These traces can be on a top surface of the substrate or a bottom surface of the substrate. Where the substrate is formed of multiple layers, these traces can be on a top surface, sides, and bottom surface of each layer. Using vias, the electrical signals can be routed through the layers and to pads on the bottom of the substrate for connection to a printed circuit board via solder balls or columns.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
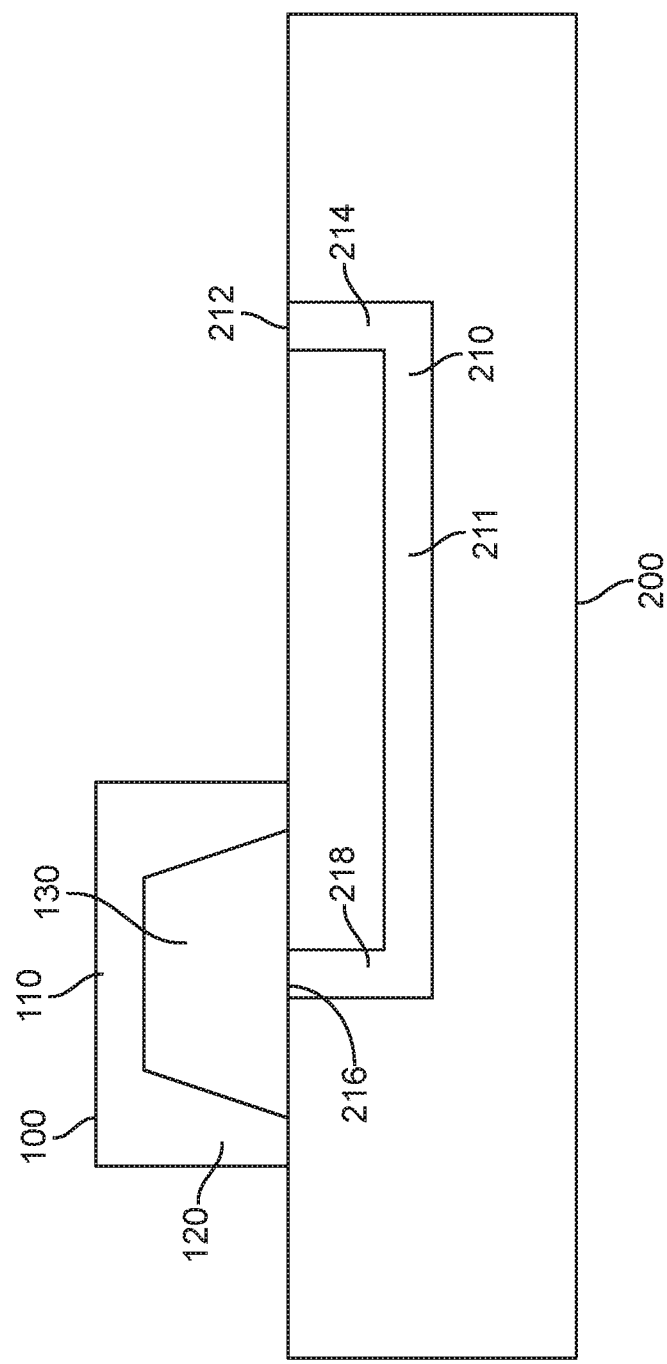
FIG. 1 illustrates a cross-section of a portion of a pressure sensor system according to an embodiment of the present invention.

FIG. 1 illustrates a cross-section of a portion of a pressure sensor system according to an embodiment of the present invention. This figure, as with the other included figures, is shown for illustrative purposes and does not limit either the possible embodiments of the present invention or the claims.

In this example, a passage 210 to a backside cavity 130 of pressure sensor die 100 can be formed in substrate 200. Passage 210 can include a first opening 212 on a top side of substrate 200. This first opening 212 can be defined by a first through-hole 214 that can connect to a second through-hole 218 via slot or path 211. Second through-hole 218 can define a second opening 216, and can connect to backside cavity 130 of pressure sensor die 100. Substrate 200 can be a multilevel printed circuit board or it can be formed using multiple layers of ceramic, silicon, plastic, or other material.

Pressure sensor die 100 can include membrane 110 supported by frame 120. Pressure sensor die 100 can further include one or more resistors or transistors (not shown.) These one or more resistors or transistors can be located on or near membrane 110. For example, resistors for a Wheatstone bridge can be formed on or near membrane 110.

Bottom portions of frame 120 can be attached to a top surface of substrate 200. For example, adhesive, die attach structures, or other combinations of materials can be used to attach bottom portions of frame 120 to substrate 200, either directly or indirectly. This attachment can form a seal such that gas or liquid to be measured does not leak from or into backside cavity 130. In this configuration, pressure sensor die 100 can measure a differential pressure between a pressure at a top side of membrane 110 and a top side of substrate 200 at first opening 212.

In these and other embodiments of the present invention, passage 210 can be formed in various ways. For example, substrate 200 can be formed of various horizontal layers that can be vertically stacked on each other and held together by intervening layers of adhesive or other material. One or more of these layers can include vertical vias that are aligned to form first through-hole 214 and second through-hole 218 that are aligned with and provide access to ends of slot or path 211. Some or all of a portion of one or more layers can be removed to form slot or path 211. This material can be removed by a router, by etching, or by other techniques. Some or all of passage 210 can be plated with metal to reduce leakage. Further details of substrate 200 are shown below in FIGS. 6 and 7.

Substrate 200 can also include traces and pads (not shown) that can connect pressure sensor die 100 to other components on substrate 200 or elsewhere in the pressure sensor system. Conditioning, processing, or other circuits, such as ASIC 530 (shown in FIG. 5), can be connected to pressure sensor die 100 to other components on substrate 200 or elsewhere in the system. Pressure sensor die 100 can be connected to traces and pads of substrate 200 and other components using bond wires 1420 (shown in FIG. 14) or other interconnect structures. A cap, such as cap 300 shown in FIG. 3 below, can be attached to substrate 200 to enclose pressure sensor die 100 to form a pressure sensor system. Either or both cap 300 and substrate 200 can divide the pressure sensor system internally into two (or more) chambers, such as first chamber 312 and second chamber 314 (shown in FIG. 3.) First through-hole 214 can be located in first chamber 312 while a top surface of membrane 110 can be in second chamber 314. Ports in the cap can provide access to either or both chambers such that the pressure sensor system can be used in absolute, gauge, or differential pressure sensor configurations.

Figure 2:
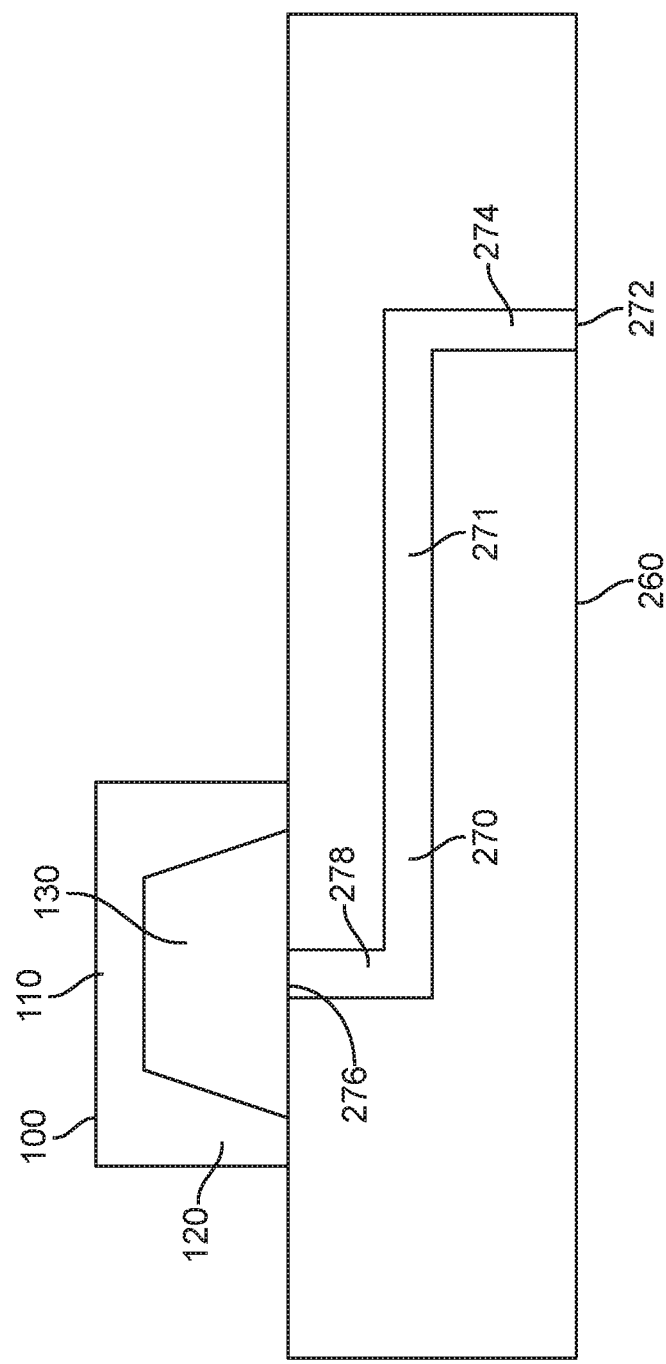
FIG. 2 illustrates a cross-section of a portion of another pressure sensor system according to an embodiment of the present invention.

FIG. 2 illustrates a cross-section of a portion of another pressure sensor system according to an embodiment of the present invention. In this example, a passage 270 to a backside cavity 130 of pressure sensor die 100 can be formed in substrate 260. This passage 270 can include a first opening 272 on a bottom side of substrate 260. This first opening 272 can be defined by a first through-hole 274 that can connect to a second through-hole 278 through a slot or path 271 to form passage 270. Second through-hole 278 can define a second opening 276, and can connect to backside cavity 130 of pressure sensor die 100.

Pressure sensor die 100 can include membrane 110 supported by frame 120. Pressure sensor die 100 can further include one or more resistors or transistors (not shown), which can be located on or near membrane 110. For example, resistors for a Wheatstone bridge can be formed on or near membrane 110.

Bottom portions of frame 120 can be attached to a top surface of substrate 260. For example, adhesive, die attach structures, or other combinations of materials can be used to attach bottom portions of frame 120 to substrate 260, either directly or indirectly. This attachment can form a seal such that gas or liquid to be measured does not leak from or into backside cavity 130. In this configuration, pressure sensor die 100 can measure a differential pressure between a pressure at a top side of membrane 110 and a bottom side of substrate 260 at first opening 272.

In these and other embodiments of the present invention, passage 270 can be formed in various ways. For example, substrate 260 can be formed of various horizontal layers that can be vertically stacked on each other and held together by intervening layers of adhesive or other material. One of these layers can include a vertical via that that forms first through-hole 274, while another layer can include a vertical via that forms second through-hole 278. Some or all of a portion of one or more layers can be removed to form slot or path 271. This material can be removed by a router, by etching, or by other techniques. Some or all of passage 270 can be plated with metal to reduce leakage.

Substrate 260 can also include traces and pads (not shown) that can connect pressure sensor die 100 to other components on substrate 260 or elsewhere in the system. Conditioning, processing, or other circuits, such as ASIC 530 (shown in FIG. 5), can be connected to pressure sensor die 100 to other components on substrate 260 or elsewhere in the system. Pressure sensor die 100 can be connected to traces and pads of substrate 260 and other components using bond wires 1420 (shown in FIG. 14) or other interconnect structures.

Substrate 260 can divide a pressure sensor device into two (or more) chambers, one above substrate 260 and one below substrate 260. The chambers can be fitted with nozzles to receive a gas or liquid at a pressure. A differential pressure can then be measured by pressure sensor die 100.

Figure 3:
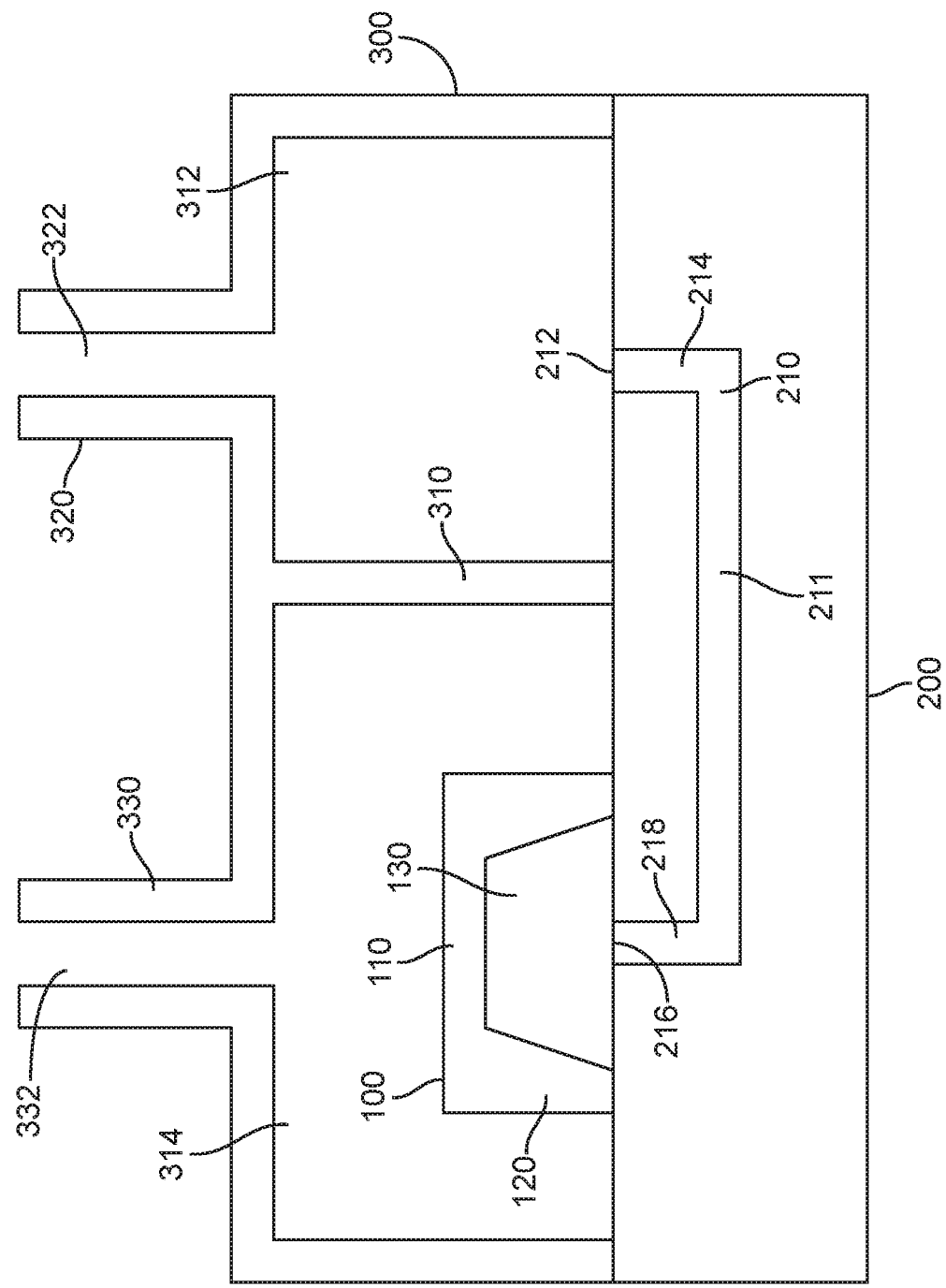
FIG. 3 illustrates a cross-section of a pressure sensor system according to an embodiment of the present invention.

FIG. 3 illustrates a cross-section of a pressure sensor system according to an embodiment of the present invention. In this example, a passage 210 to a backside cavity 130 of pressure sensor die 100 can be formed in substrate 200. This passage 210 can include a first opening 212 on a top side of substrate 200. This opening can be defined by a first through-hole 214 that can connect to a second through-hole 218 via slot or path 211. Second through-hole 218 can define a second opening 216, and can connect to backside cavity 130 of pressure sensor die 100. Substrate 200 can be a multilevel printed circuit board or it can be formed using multiple layers of ceramic, silicon, plastic, or other material.

Pressure sensor die 100 can include membrane 110 supported by frame 120. Pressure sensor die 100 can further include one or more resistors or transistors (not shown.) These one or more resistors or transistors can be located on or near membrane 110. For example, resistors for a Wheatstone bridge can be formed on or near membrane 110.

Bottom portions of frame 120 can be attached to a top surface of substrate 200. For example, adhesive, die attach structures, or other combinations of materials can be used to attach bottom portions of frame 120 to substrate 200, either directly or indirectly. This attachment can form a seal such that gas or liquid to be measured does not leak from or into backside cavity 130. In this configuration, pressure sensor die 100 can measure a differential pressure between a pressure at a top side of membrane 110 and a top side of substrate 200 at first opening 212.

In these and other embodiments of the present invention, passage 210 can be formed in various ways. For example, substrate 200 can be formed of various horizontal layers that can be vertically stacked on each other and held together by intervening layers of adhesive or other material. One or more of these layers can include vertical vias that are aligned to form first through-hole 214 and second through-hole 218 that are aligned with and provide access to ends of slot or path 211. Some or all of a portion of one or more layers can be removed to form slot or path 211. This material can be removed by a router, by etching, or by other techniques. Some or all of passage 210 can be plated with metal to reduce leakage. Further details of substrate 200 are shown below in FIGS. 6 and 7.

Substrate 200 can also include traces and pads (not shown) that can connect pressure sensor die 100 to other components on substrate 200 or elsewhere in the system. Conditioning, processing, or other circuits, such as ASIC 530 (shown in FIG. 5), can be connected to pressure sensor die 100 to other components on substrate 200 or elsewhere in the system. Pressure sensor die 100 can be connected to traces and pads of substrate 200 and other components using bond wires 1420 (shown in FIG. 14) or other interconnect structures.

Cap 300 can be attached to substrate 200 to form a pressure sensor system. Cap 300 can be attached to substrate 200 using an adhesive, by soldering, or by using other techniques and substances. Either or both cap 300 and substrate 200 can divide the pressure sensor system internally into two chambers. In this example, cap 300 can include inner wall 310 to divide the pressure sensor system internally into two chambers, specifically first chamber 312 and second chamber 314. First through-hole 214 can be located in first chamber 312, while a top surface of membrane 110 can be in second chamber 314. A first port including first nozzle opening 322 in first nozzle 320 can provide access to first chamber 312, while a second port including second nozzle opening 332 in second nozzle 330 can provide access to second chamber 314. This can allow the pressure sensor system to be used in absolute, gauge, or differential pressure sensor configurations. Conditioning, processing, or other circuits, such as ASIC 530, can be located in either or both first chamber 312 and second chamber 314. Cap 300 can be formed of plastic, nylon, acrylic, or other material. Cap 300 can be formed by insert or injection molding, 3-D printing, or other technique.

Figure 4:
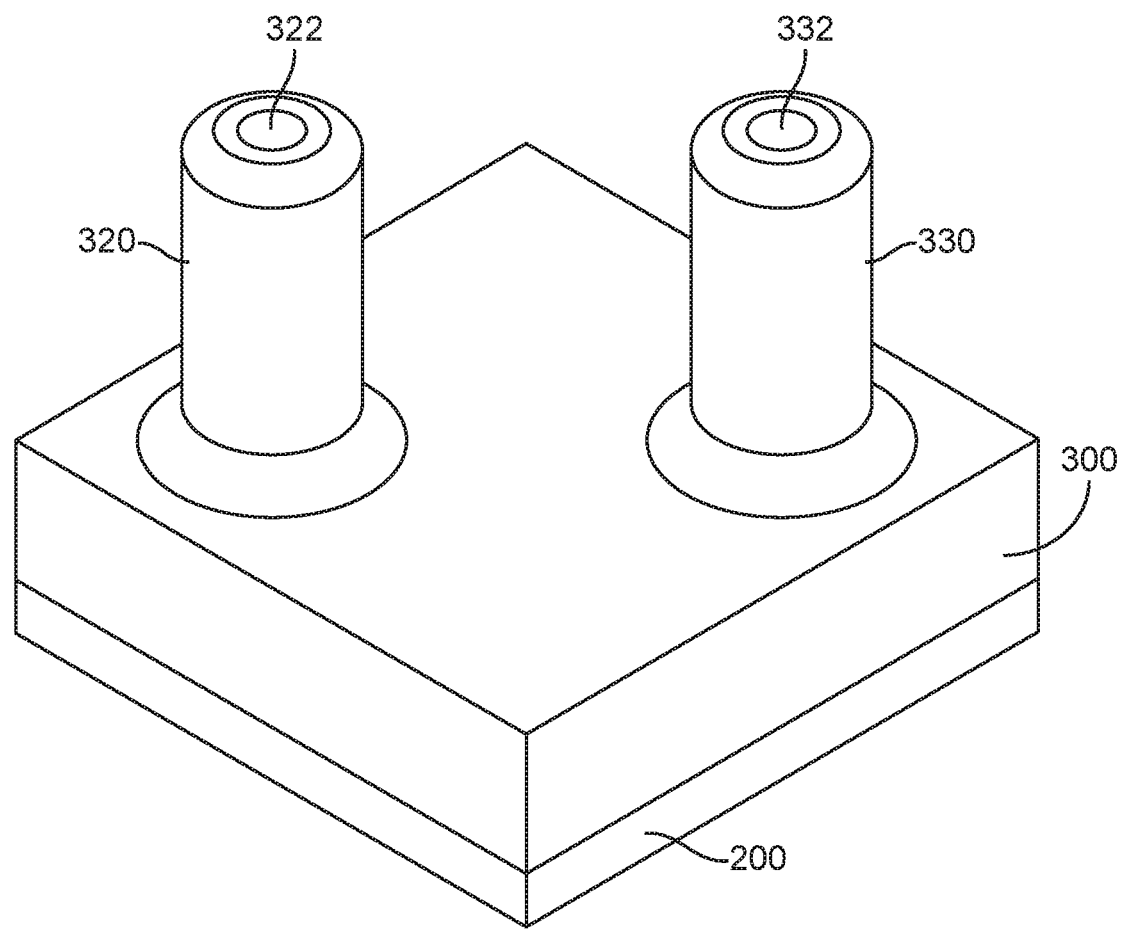
FIG. 4 illustrates a pressure sensor system according to an embodiment of the present invention.

FIG. 4 illustrates a pressure sensor system according to an embodiment of the present invention. This pressure sensor system can include substrate 200 and cap 300. Cap 300 can further include a first port including first nozzle 320 having first nozzle opening 322 and a second port including second nozzle 330 having second nozzle opening 332. A first tube or pipe (not shown) can be fit over first nozzle 320. A first gas or liquid whose pressure is to be measured can be present in the first tube. This pressure sensor system can be configured as an absolute pressure sensor by sealing or otherwise closing off second nozzle opening 332 in second nozzle 330. Alternatively, an absolute pressure sensor die 100 can be used, where backside cavity 130 is sealed and has a known pressure, such as a vacuum or other known pressure. This pressure sensor system can be configured as a gauge pressure sensor by allowing a local atmosphere access to second nozzle opening 332 in second nozzle 330. This pressure sensor system can be configured as a differential pressure sensor by attaching a second tube or pipe (not shown) over second nozzle 330, where a second gas or liquid can be present in the second tube. In this way, the pressure sensor system can measure a differential pressure between the pressure of the first gas or liquid and the second gas or liquid.

In this example, the first nozzle 320 and second nozzle 330 are shown as having a cylindrical shape. In these and other embodiments of the present invention, first nozzle 320 and second nozzle 330 can include barbs, or other structures or features. These barbs, or other structures or features, can be helpful in securing a first tube and second tube to first nozzle 320 and second nozzle 330. Also, while nozzles designed to be fit in a tube or other conduit can be used with cap 300, other structures can be used. For example, these tubes or other conduits can fit into structures that can be used with cap 300.

Figure 5:
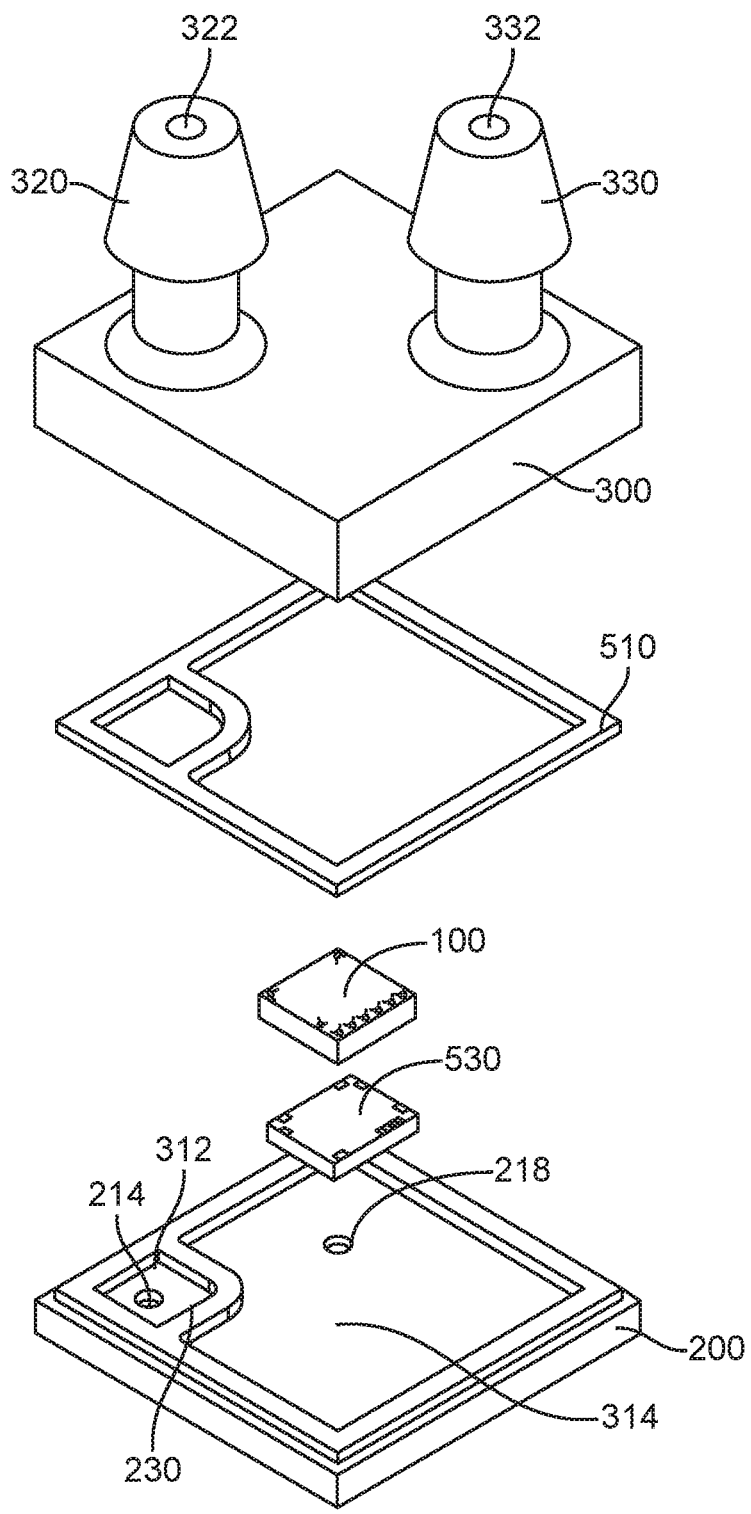
FIG. 5 is an exploded view of a pressure sensor system according to an embodiment of the present invention.
Figure 6:
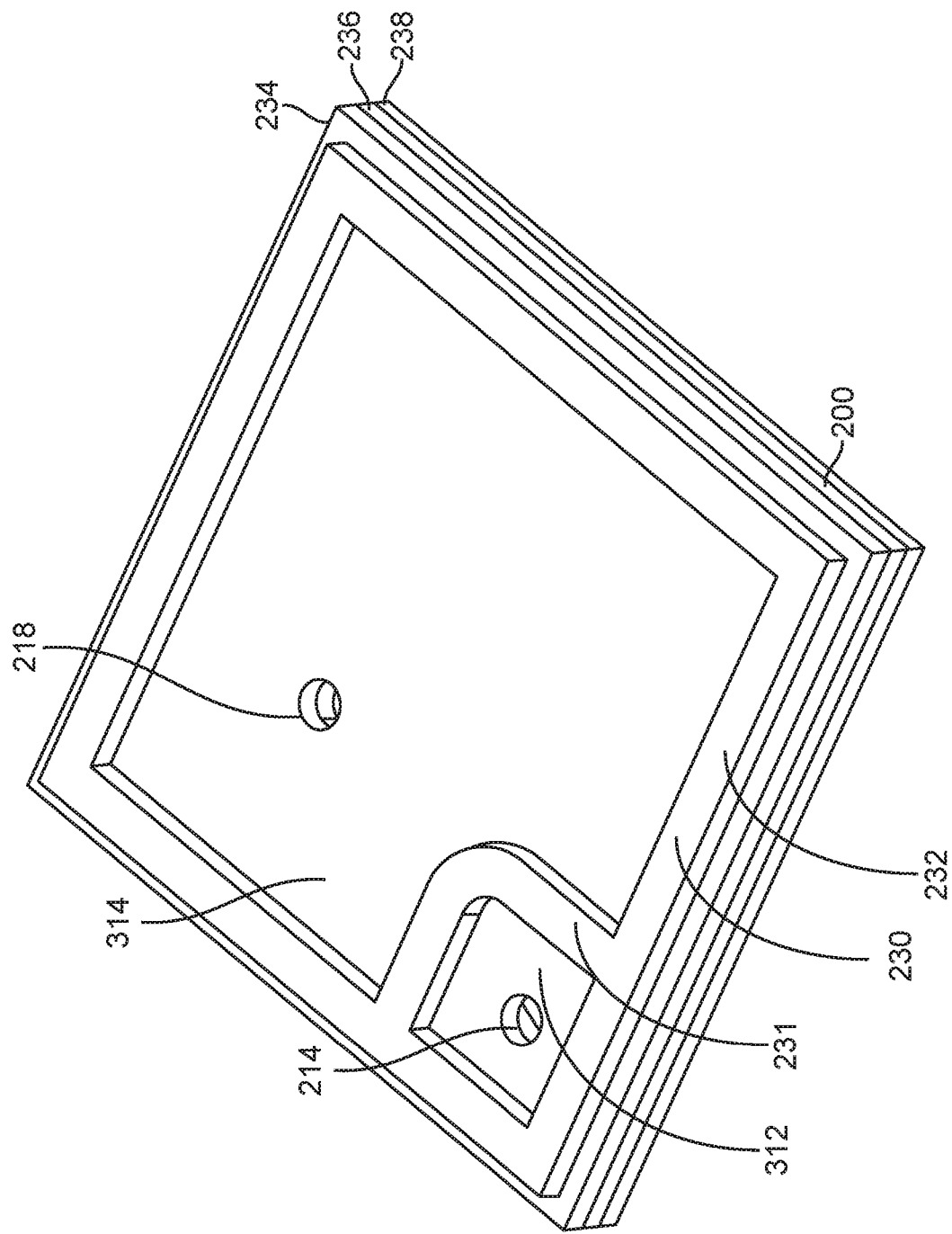
FIG. 6 is a more detailed view of a substrate according to an embodiment of the present invention.
Figure 7:
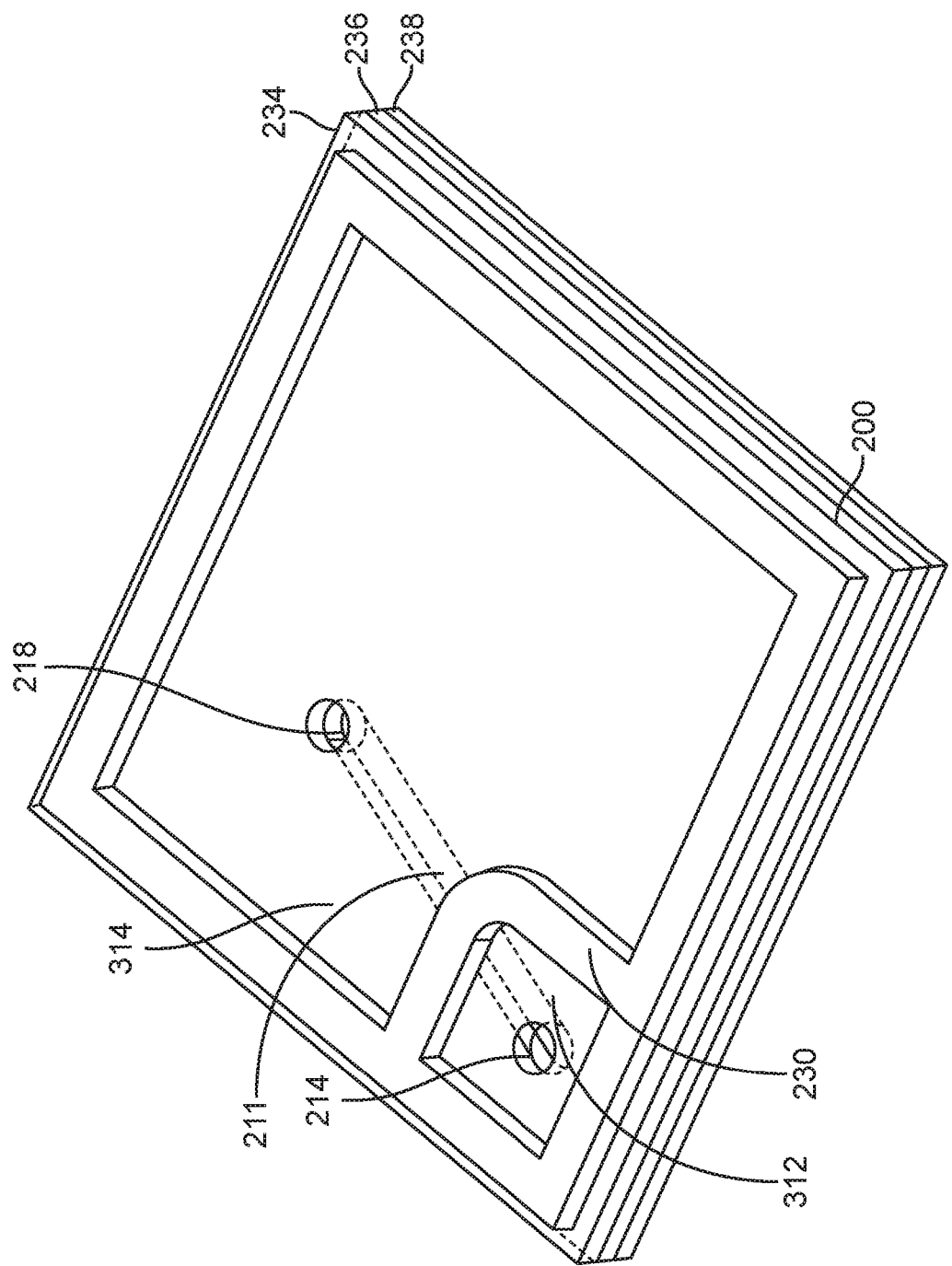
FIG. 7 is a more detailed view of a substrate according to an embodiment of the present invention.

FIG. 5 is an exploded view of a pressure sensor system according to an embodiment of the present invention. Cap 300 can include first nozzle 320 having first nozzle opening 322 and second nozzle 330 having second nozzle opening 332. In this example, first nozzle 320 and second nozzle 330 can include barbed features. This pressure sensor system can further include substrate 200. Substrate 200 can include a number of layers as shown in FIG. 6 and FIG. 7. Substrate 200 can include first through-hole 214 and second through-hole 218. First through-hole 214 can be connected to second through-hole 218 via slot or path 211 (shown in FIG. 7) in substrate 200. Substrate 200 can further include ribbed portion 230. Ribbed portion 230 can separate first chamber 312 from second chamber 314.

Cap 300 can be attached to substrate 200 using an adhesive or epoxy layer 510. Adhesive or epoxy layer 510 can be applied along a top surface of ribbed portion 230. Pressure sensor die 100 can include backside cavity 130 (shown in FIG. 3.) Pressure sensor die 100 can be attached to substrate 200 such that second through-hole 218 is aligned with backside cavity 130. Frame 120 (shown in FIG. 3) of pressure sensor die 100 can be attached directly or indirectly to a top surface of substrate 200. ASIC 530 can perform computation, calibration, or other functions for this pressure sensor system. Appropriate firmware and software can operate on ASIC 530. ASIC 530 can be located in second chamber 314, or ASIC 530 can be located in first chamber 312. Other components such as resistors, bypass capacitors, can be included in either first chamber 312 or second chamber 314. Pressure sensor die 100 and ASIC 530 can be attached to each other or to other components internal or external to the pressure sensor system via a bond wires 1420 (shown in FIG. 14) and traces (not shown) on or in substrate 200.

A bottom surface (not shown) of cap 300 can include a groove (not shown) that corresponds to ribbed portion 230. This can allow cap 300 to attach to substrate 200 in a tongue and groove fashion. A bottom side of cap 300 can be otherwise substantially flat. In this case, a height of ribbed portion 230 can be high enough to accommodate a height of pressure sensor die 100 and ASIC 530, as well as their bond wires 1420 and other components that can be present. Alternatively, a bottom side of cap 300 can include one or more recesses to accommodate for the height of these components. These one or more recesses can be shaped to correspond to first chamber 312 and second chamber 314, or they can have other shapes.

FIG. 6 is a more detailed view of a substrate according to an embodiment of the present invention. Substrate 200 can include a top layer 234 having first through-hole 214 and second through-hole 218. A second or middle layer 236 can include slot or path 211 (shown in FIG. 7) that joins first through-hole 214 and second through-hole 218. A third or bottom layer 238 can be a solid layer. Ribbed portion 230 can be located on a top surface of top layer 234. Ribbed portion 230 can include an outside portion 232 and an inside portion 231. Inside portion 231 can separate first chamber 312 from second chamber 314. Top layer 234, middle layer 236, bottom layer 238, and ribbed portion 230 can be formed of plastic, ceramic, silicon, printed circuit board material such as FR4, or other material, and they can be laminated or otherwise attached to each other using epoxy, adhesive, or other material.

FIG. 7 is a more detailed view of a substrate according to an embodiment of the present invention. Substrate 200 can include a top layer 234 having first through-hole 214 and second through-hole 218. A second or middle layer 236 can include slot or path 211 that joins first through-hole 214 and second through-hole 218. Slot or path 211 can be substantially straight, or it can be curved or have another shape, for example to avoid or simplify trace routing in substrate 200. Slot or path 211 can be widened at one or both ends in a dog-bone configuration to simplify alignment of first through-hole 214 and second through-hole 218. A third or bottom layer 238 can be a solid layer. Ribbed portion 230 can be located on a top surface of top layer 234. Top layer 234, middle layer 236, bottom layer 238, and ribbed portion 230 can be formed of plastic, ceramic, silicon, a printed circuit board material such as a FR4, or other material, and they can be laminated or otherwise attached to each other using epoxy, adhesive, or other material.

Traces (not shown) can be formed on top, bottom, and sides of top layer 234, middle layer 236, bottom layer 238, and ribbed portion 230. These traces can be connected together using vias (not shown) through top layer 234, middle layer 236, bottom layer 238, and ribbed portion 230. Pads 1410 (shown in FIG. 14) and contacts, such as leadless contacts 910 (shown in FIG. 9) can be supported by substrate 200 and can be connected to these traces.

In these and other embodiments of the present invention, one or more of these layers can be omitted. For example, ribbed portion 230 can be omitted, particularly where a bottom surface of cap 300 does not include a groove. In these and other embodiments of the present invention, bottom layer 238 can be omitted, particularly where another packaging or board structure (not shown) is used under middle layer 236. Top layer 234 and middle layer 236 can be combined, for example where slot or path 211 in middle layer 236 is replaced by a groove in a bottom side of top layer 234, where the groove extends from first through-hole 214 to second through-hole 218. One or more intervening layers can be included. These layers can include further through-holes and slots or paths. For example, the passage from first through-hole 214 to second through-hole 218 can involve other layers having a slot or path that forms a portion of a passage from first through-hole 214 to second through-hole 218. These layers can further include additional through-holes as necessary to complete the passage.

Figure 8:
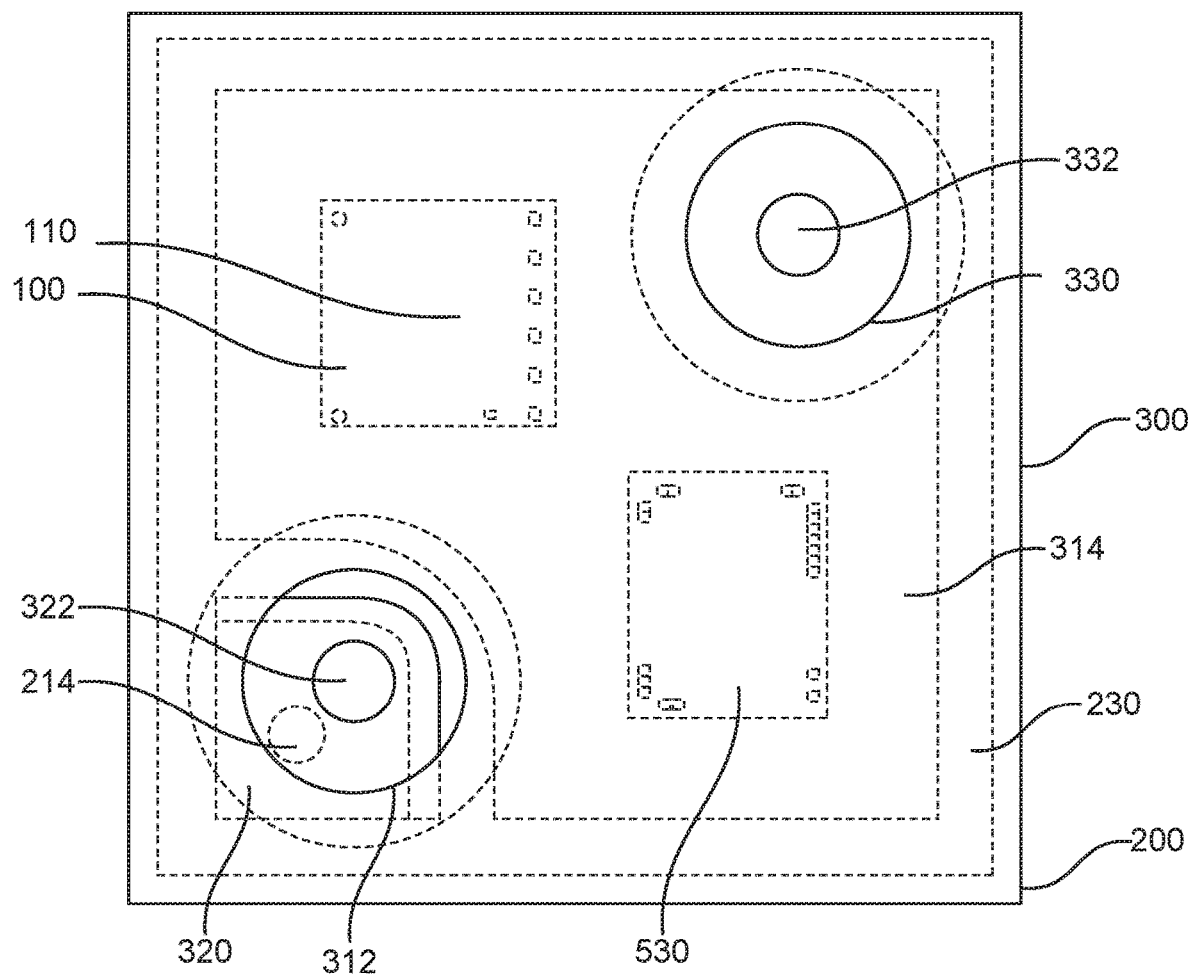
FIG. 8 illustrates a transparent top view of a pressure sensor system according to an embodiment of the present invention.

FIG. 8 illustrates a transparent top view of a pressure sensor system according to an embodiment of the present invention. Cap 300 can include first nozzle 320 having first nozzle opening 322 and second nozzle 330 having second nozzle opening 332. Substrate 200 can include ribbed portion 230, which can be used in forming a seal with cap 300 and in separating first chamber 312 from second chamber 314. First through-hole 214 in substrate 200 can be located in first chamber 312 while second through-hole 218 (shown in FIG. 7) can be located under pressure sensor die 100 in second chamber 314. ASIC 530 can be located in second chamber 314, though ASIC 530 can be located in first chamber 312 or elsewhere in or associated with this pressure sensor system.

This pressure sensor system can be used as a differential pressure sensor. In this configuration, a first gas or liquid can be applied via a first tube or pipe (not shown) to first nozzle 320. The first gas or liquid can flow through first nozzle opening 322 into first chamber 312. The first gas or liquid can flow through first through-hole 214, slot or path 211 (shown in FIG. 7), second through-hole 218 (shown in FIG. 7), and into backside cavity 130 (shown in FIG. 3) of pressure sensor die 100, where it can exert a force on a bottom side of membrane 110. A second gas or liquid can be applied via a second tube or pipe (not shown) to second nozzle 330. The second gas or liquid can flow through second nozzle opening 332 into second chamber 314, where it can exert a force on a top side of membrane 110. This pressure sensor system can also be used as a gauge pressure sensor, where one of either first nozzle opening 322 or second nozzle opening 332 can be exposed to ambient conditions. This pressure sensor system can also be used as an absolute pressure sensor, where one of either first nozzle opening 322 or second nozzle opening 332 can be sealed while a gas or liquid to be measured is applied to the unsealed nozzle opening. Alternatively, an absolute pressure sensor die 100 can be used, where backside cavity 130 is sealed and has a known pressure, such as a vacuum or other known pressure.

Substrate 200 can include leadless contacts that can be soldered to a board or other appropriate substrate in a device that is employing a pressure sensor system according to an embodiment of the present invention. The use of leadless contacts can save board space in the device. In the example above, substrate 200 is shown as having a square-shaped, though substrate 200 can alternatively have a rectangular or other shaped. Examples of pressure sensor systems employing such substrates are shown in the following figures.

Figure 9:
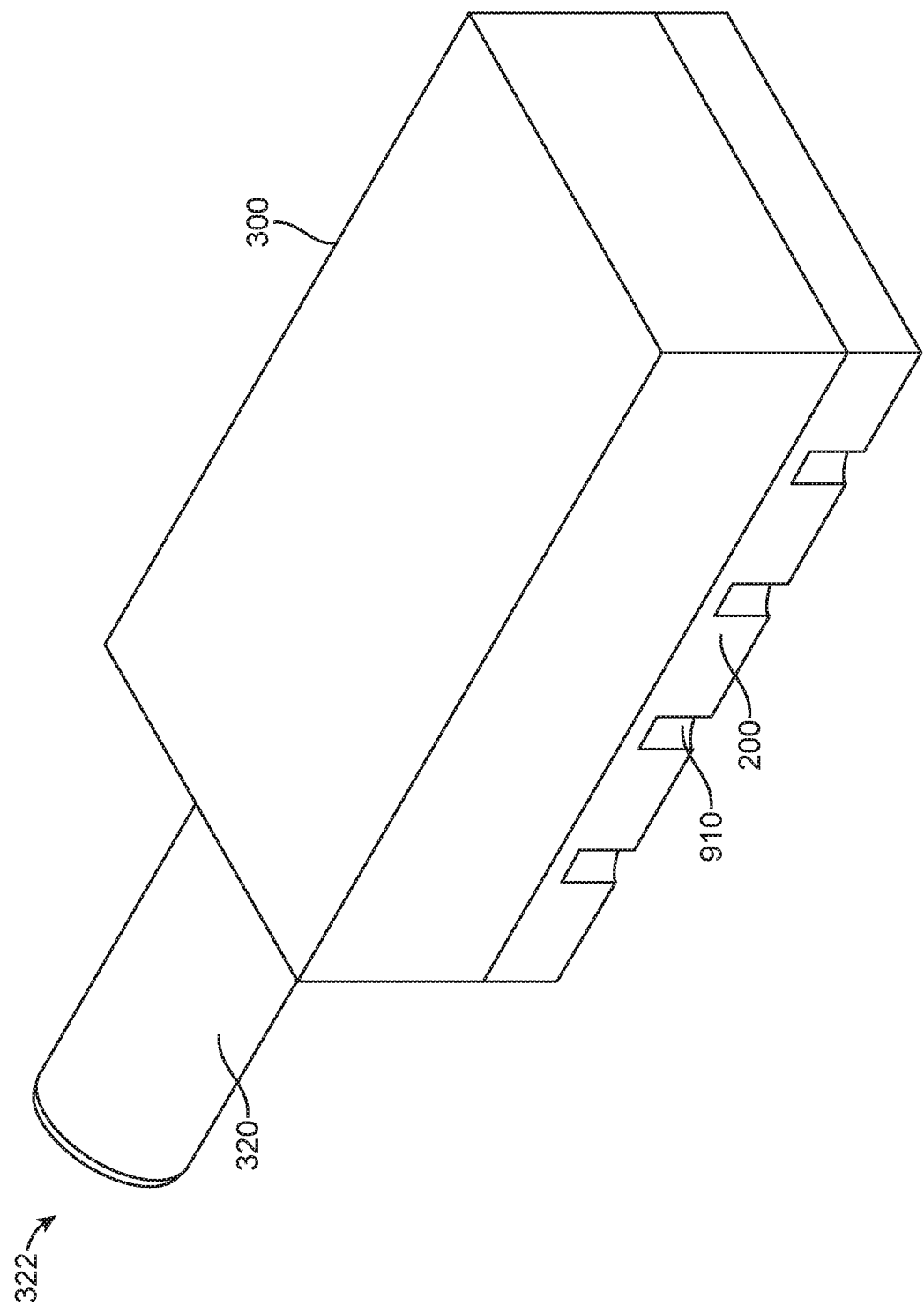
FIG. 9 illustrates a pressure sensor system according to an embodiment of the present invention.

FIG. 9 illustrates a pressure sensor system according to an embodiment of the present invention. In this example, cap 300 can include first nozzle 320 having first nozzle opening 322. Substrate 200 can include leadless contacts 910. Leadless contacts 910 can be plated and soldered to a board or other appropriate substrate.

Figure 10:
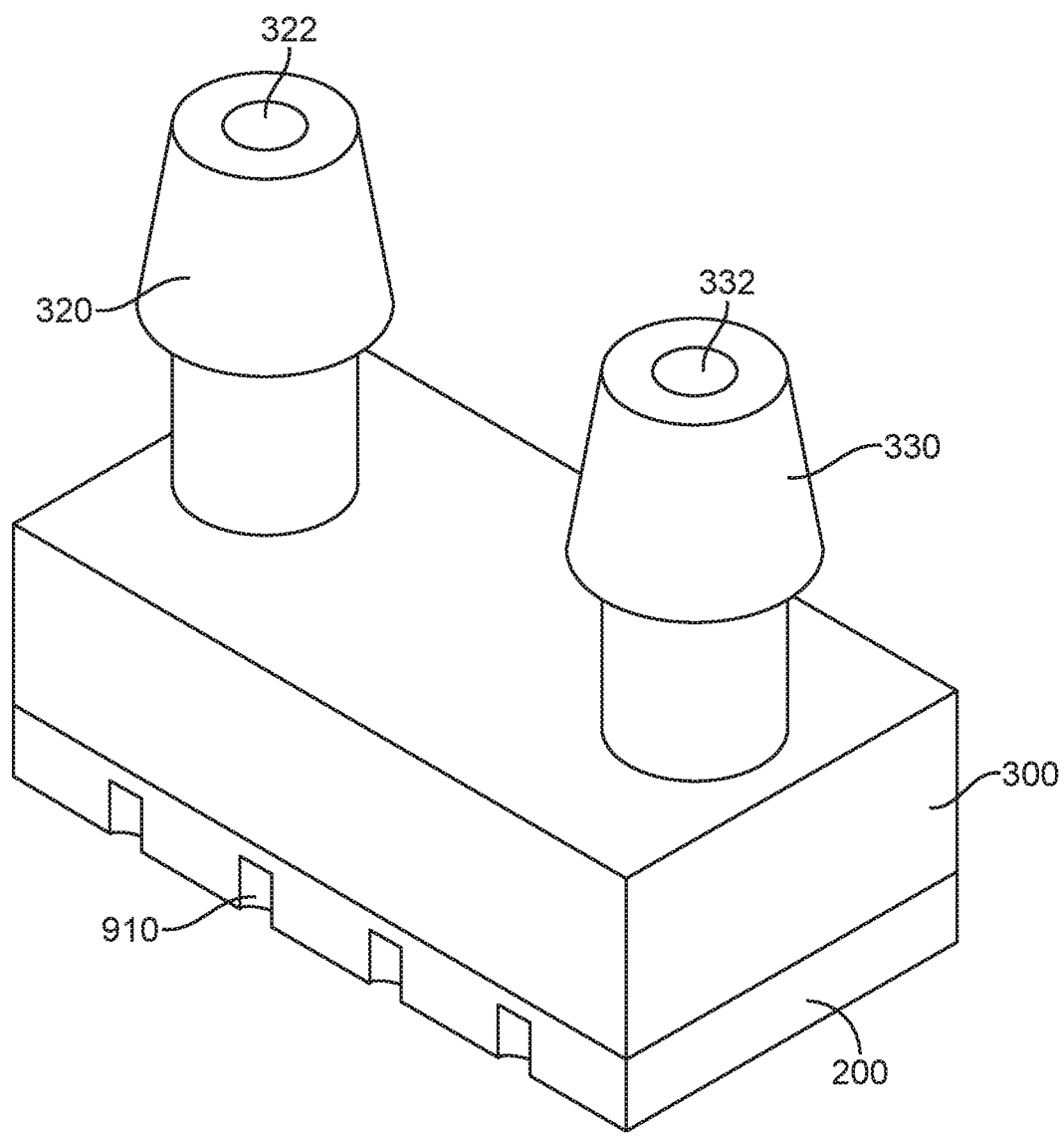
FIG. 10 illustrates another pressure sensor system according to an embodiment of the present invention.

FIG. 10 illustrates another pressure sensor system according to an embodiment of the present invention. In this example, cap 300 can include first nozzle 320 having first nozzle opening 322 and second nozzle 330 having second nozzle opening 332. In this example, first nozzle 320 and second nozzle 330 are shown as having barbs. Cap 300 can be attached to substrate 200, which can include leadless contacts 910. Leadless contacts 910 can be plated and soldered to a board or other appropriate substrate.

Figure 11:
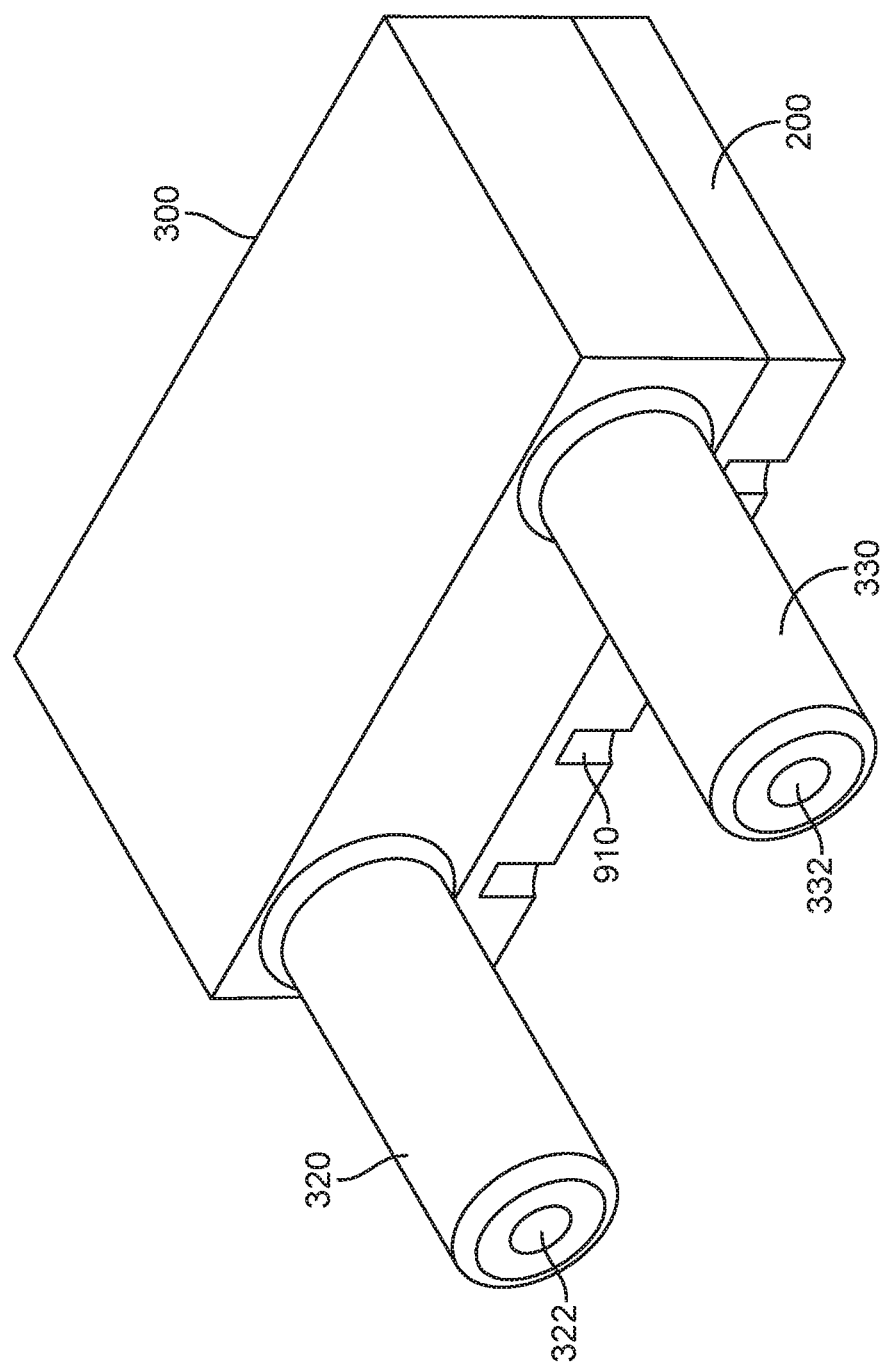
FIG. 11 illustrates another pressure sensor system according to an embodiment of the present invention.

FIG. 11 illustrates another pressure sensor system according to an embodiment of the present invention. In this example, cap 300 can include first nozzle 320 having first nozzle opening 322 and second nozzle 330 having second nozzle opening 332. First nozzle 320 and second nozzle 330 are shown as having a cylindrical shape. Cap 300 can be attached to substrate 200, which can include leadless contacts 910. Leadless contacts 910 can be plated and soldered to a board or other appropriate substrate.

In these and other embodiments of the present invention, first chamber 312 can be separated from second chamber 314 by portions of either or both cap 300 or substrate 200. In the example of FIG. 4, ribbed portion 230 (shown in FIG. 4) can at least partially divide an interior of a pressure sensor system into first chamber 312 and second chamber 314. In the following example, substrate 200 can have a relatively flat surface, and features, such as an interior wall, of cap 300 can be used to at least partially divide an interior of a pressure sensor system.

Figure 12:
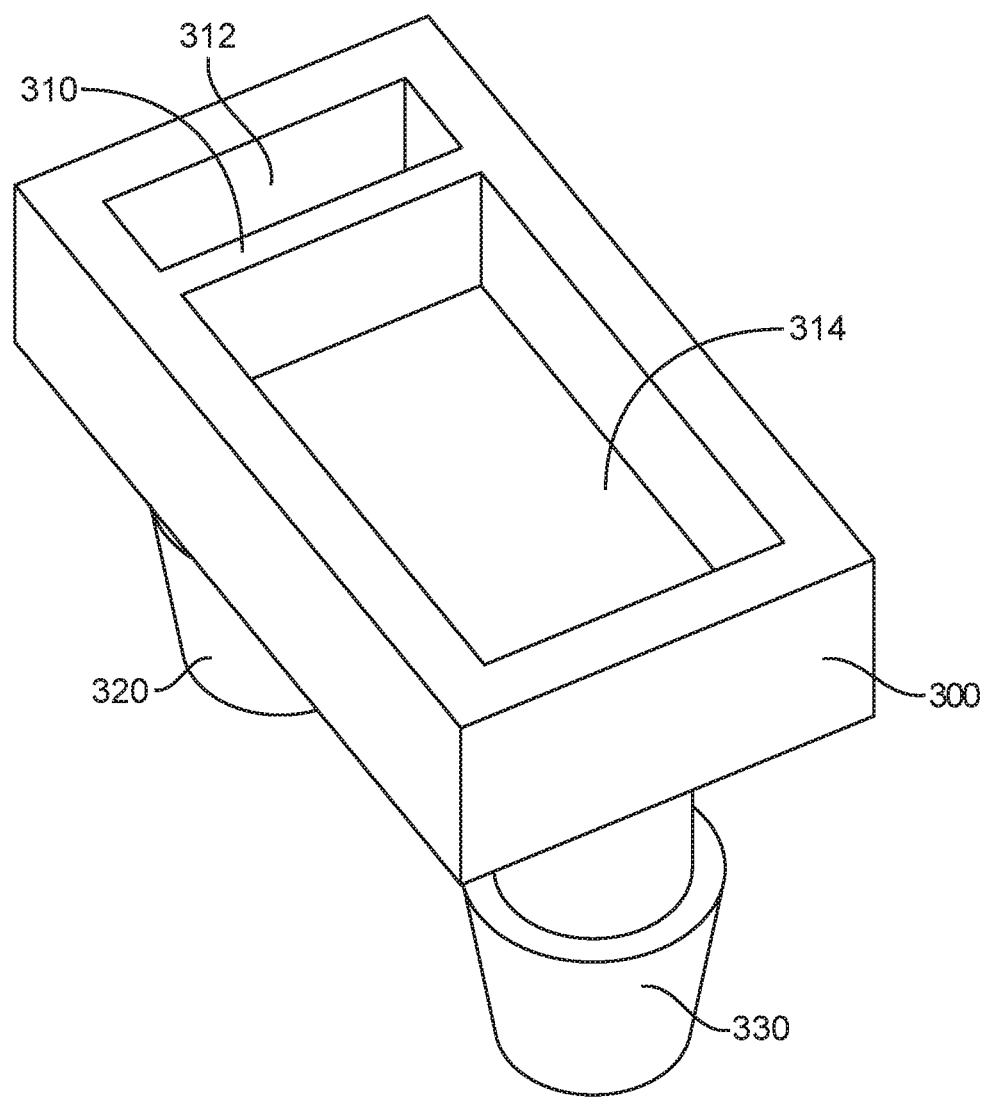
FIG. 12 illustrates a cap for a pressure sensor system according to an embodiment of the present invention.

FIG. 12 illustrates a cap for a pressure sensor system according to an embodiment of the present invention. This cap can be used as the cap 300 in the pressure sensor system of FIG. 10 or as a cap 300 in other pressure sensor systems according to these and other embodiments of the present invention. Cap 300 can include an inner wall 310 separating first chamber 312 from second chamber 314. Cap 300 can include first nozzle 320 to provide access to first chamber 312, as well as second nozzle 330 to provide access to second chamber 314. Cap 300 can be attached to a substantially flat substrate 200 using an adhesive or epoxy, as shown in the following figure.

Figure 13:
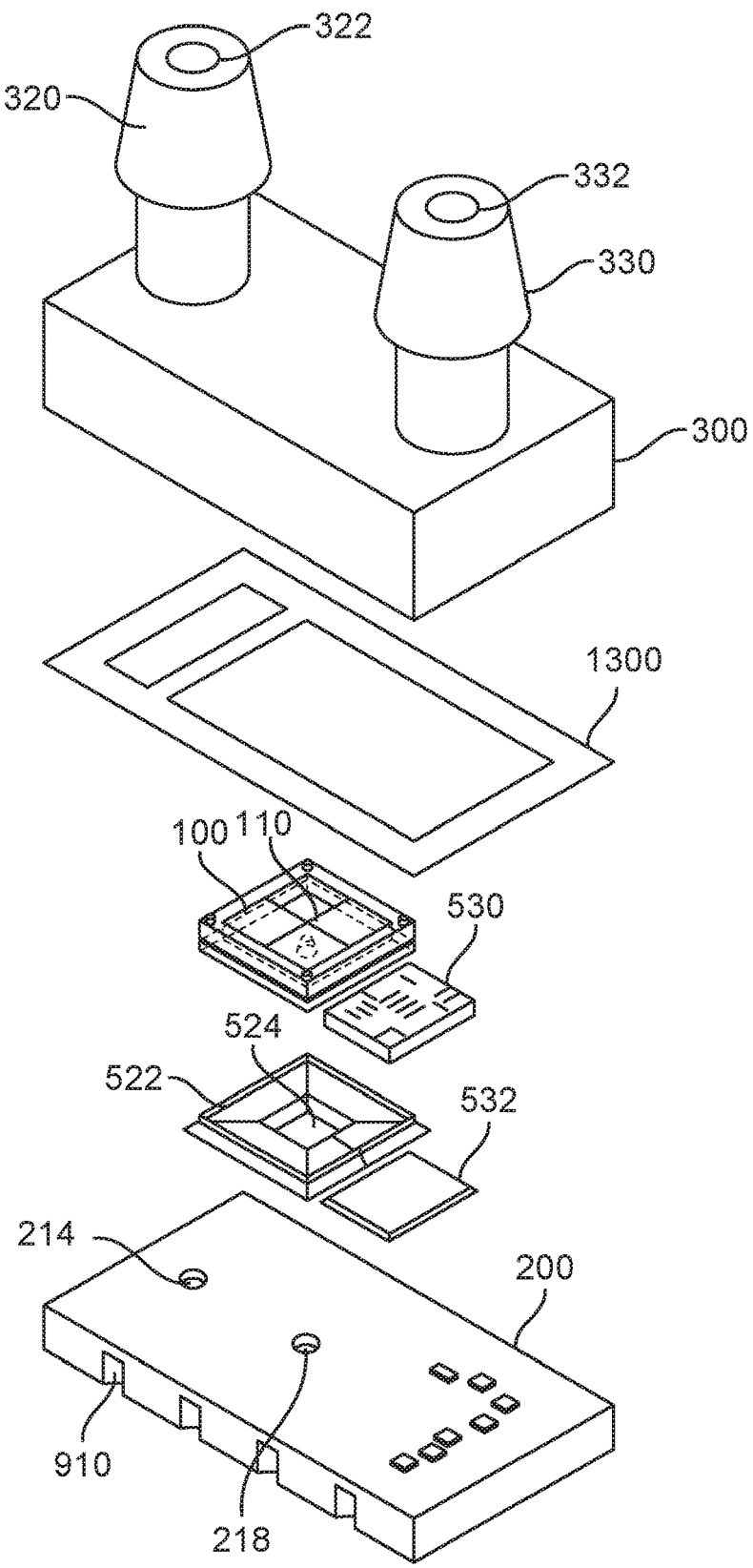
FIG. 13 illustrates an exploded view of a pressure sensor system according to an embodiment of the present invention.

FIG. 13 illustrates an exploded view of a pressure sensor system according to an embodiment of the present invention. Cap 300 can include first nozzle 320 having first nozzle opening 322, as well as second nozzle 330 having second nozzle opening 332. Cap 300 can be attached to a top surface of substrate 200 using epoxy or adhesive layer 1300. Die attach structure 522 can be used to secure pressure sensor die 100 to a top surface of substrate 200. Specifically, second through-hole 218 can be aligned with opening 524 in die attached structure 522 and backside cavity 130 (shown in FIG. 3) in pressure sensor die 100. Die attach structure 532 can be used to secure ASIC 530 to a top surface of substrate 200. Substrate 200 can further include first through-hole 214 and slot or path 211 (shown in FIG. 16) to connect first through-hole 214 to second through-hole 218. Pressure sensor die 100 and ASIC 530 can be connected to components and devices external to the pressure sensor system using leadless contacts 910.

A first gas or liquid can be received by first nozzle opening 322 in first nozzle 320. The first gas or liquid can pass through first chamber 312 (shown in FIG. 12) and into first through-hole 214 in substrate 200. The first gas or liquid can continue through slot or path 211 in substrate 200 and out second through-hole 218, where it can apply a force to a bottom side of membrane 110. A second gas or liquid can be received by second nozzle opening 332 in second nozzle 330. The second gas or liquid can enter second chamber 314 (shown in FIG. 12), where it can apply a force to a top side of membrane 110. As before, the pressure sensor system can operate as a differential pressure sensor in this way. This pressure sensor system can instead operate as a gauge pressure sensor by exposing either first nozzle opening 322 or second nozzle opening 332 to ambient conditions. This pressure sensor system can also operate as an absolute pressure sensor by sealing either first nozzle opening 322 or second nozzle opening 332. Alternatively, an absolute pressure sensor die 100 can be used, where backside cavity 130 is sealed and has a known pressure, such as a vacuum or other known pressure.

Figure 14:
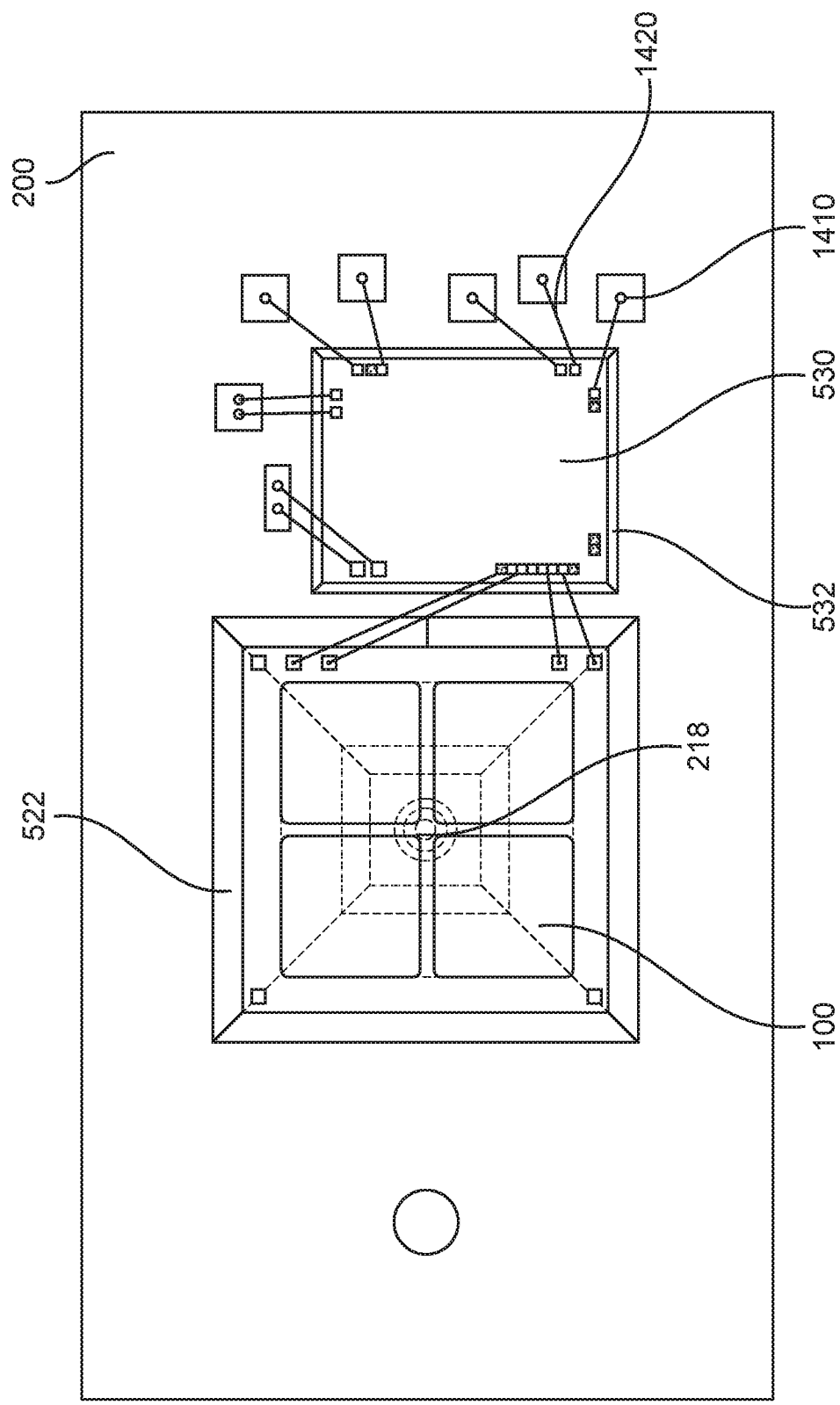
FIG. 14 illustrates a top view of a portion of a pressure sensor system according to an embodiment of the present invention.

FIG. 14 illustrates a top view of a portion of a pressure sensor system according to an embodiment of the present invention. In this example, pressure sensor die 100 can be attached to a top surface of substrate 200 using die attached structure 522. Pressure sensor die 100 can be located over second through-hole 218 in substrate 200. ASIC 530 can be attached to the top surface of substrate 200 using die attached structure 532. Bond wires 1420 can form electrical connections between either or both pressure sensor die 100 and ASIC 530 to pads 1410. Pads 1410 can connect to leadless contacts 910 (shown in FIG. 10) or other components on substrate 200 using traces (not shown) on or in substrate 200. Traces can be formed on tops, bottoms, and sides of the layers used to form substrate 200. These traces can be connected together using vias (not shown) through the layers of substrate 200. Pads 1410 (shown in FIG. 14) and contacts, such as leadless contacts 910 (shown in FIG. 9) can be supported by substrate 200 and can be connected to these traces.

Figure 15:
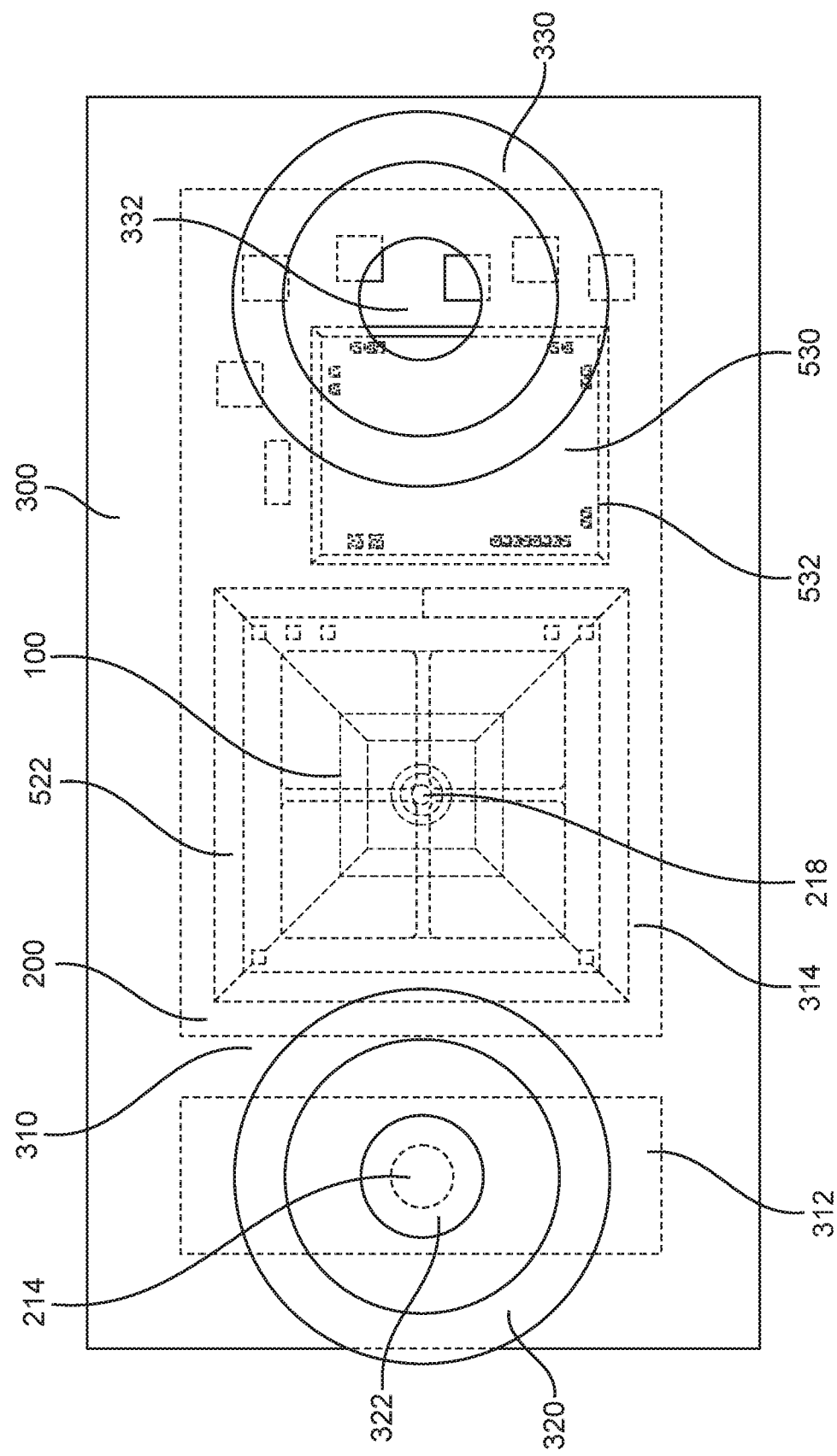
FIG. 15 illustrates a top transparent view of a pressure sensor system according to an embodiment of the present invention.

FIG. 15 illustrates a top transparent view of a pressure sensor system according to an embodiment of the present invention. Cap 300 can include first nozzle 320 having first nozzle opening 322 and second nozzle 330 having second nozzle opening 332. An inner wall 310 of cap 300 can separate first chamber 312 from second chamber 314. First through-hole 214 can connect to second through-hole 218 in substrate 200 through slot or path 211 (shown in FIG. 16.) Pressure sensor die 100 can be attached to a top surface of substrate 200 using die attach structure 522. ASIC 530 can be attached to the top surface of substrate 200 using die attach structure 532.

Figure 16:
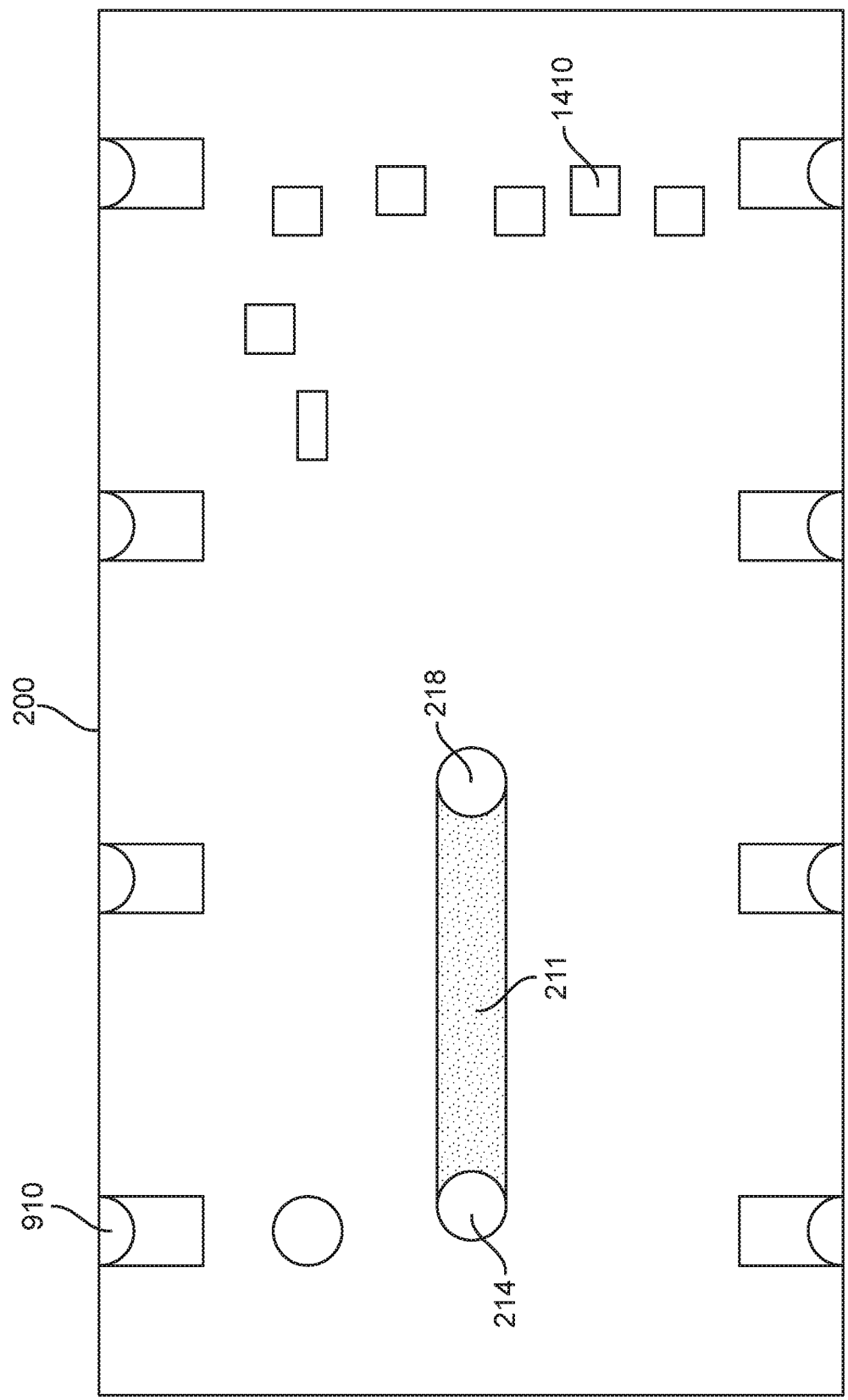
FIG. 16 is a top view of a substrate according to an embodiment of the present invention.

FIG. 16 is a top view of a substrate according to an embodiment of the present invention. Substrate 200 can include leadless contacts 910. First through-hole 214 can be connected to second through-hole 218 through internal slot or path 211. Pads 1410 can be electrically connected to leadless contacts 910 using traces (not shown) in or on substrate 200. Substrate 200 can further include a ribbed portion 230 as shown in FIG. 7.

Figure 17:
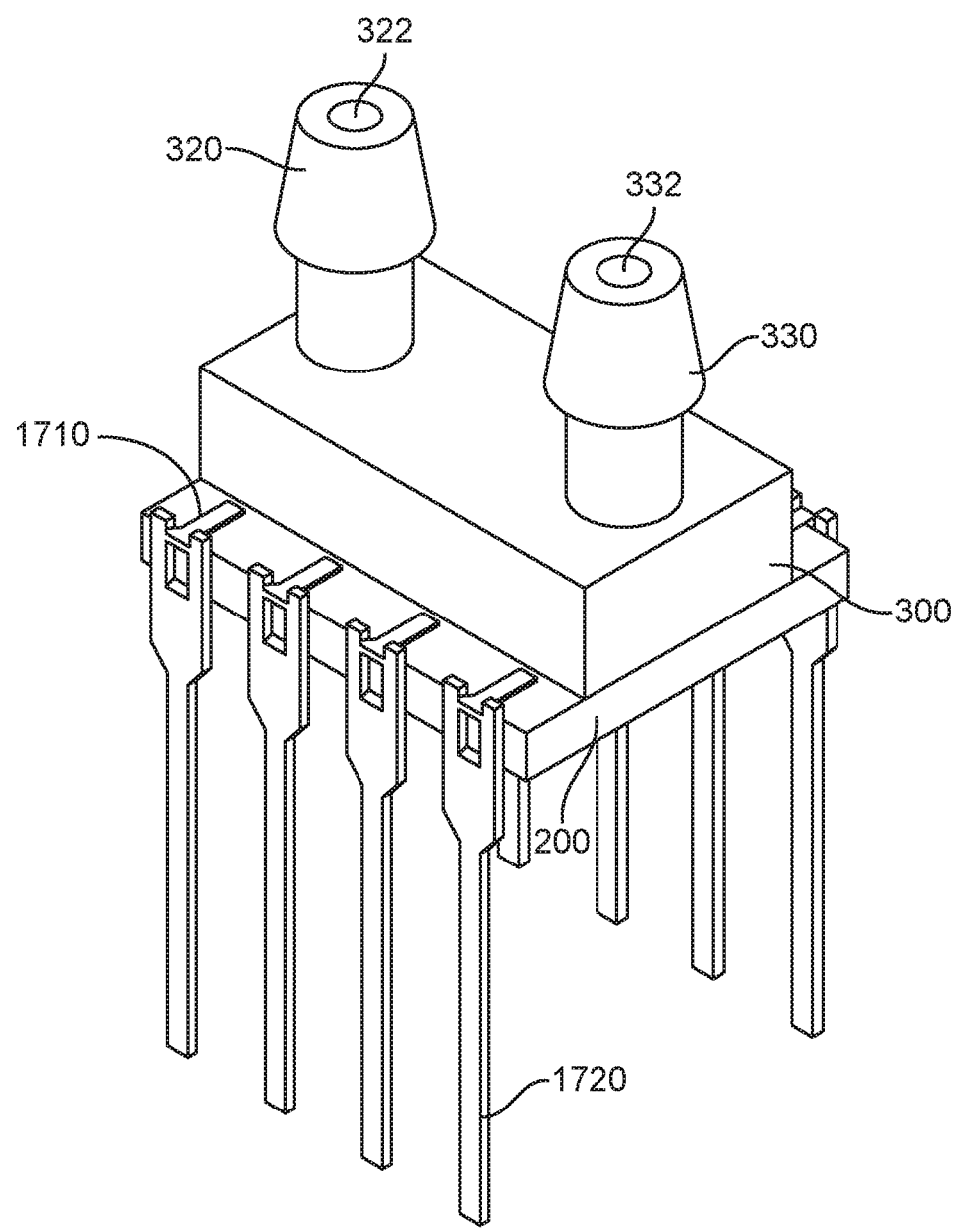
FIG. 17 illustrates another pressure sensor system according to an embodiment of the present invention.

FIG. 17 illustrates another pressure sensor system according to an embodiment of the present invention. Cap 300 can include first nozzle 320 having first nozzle opening 322, as well as second nozzle 330 having second nozzle opening 332. Cap 300 can be attached to substrate 200. Pins 1720 can include leads 1710, which can be clipped to, soldered to, or otherwise attached to traces (not shown) on substrate 200. Leads 1710 can be spring-type structures, or part of spring-type structures, that clip on and grip substrate 200, or are soldered or otherwise attached to traces on substrate 200. For example, leads 1710, together with similar leads (not shown) attached to pins 1720 and under the substrate, can clip on to, be soldered to, or otherwise be attached to traces on substrate 200. Leads 1710, along with leads under substrate 200, can be formed as part of pins 1720, or they can be formed separately and attached to pins 1720, for example by spot or laser welding, or a combination of these techniques can be used. In this way, embodiments of the present invention can provide pressure sensor systems in dual in-line packages (DIPs.)

In these and other embodiments of the present invention, substrate 200 and substrate 260 can be formed of a printed circuit board material such as FR4, ceramic, silicon, plastic, or other material. In these and other embodiments of the present invention, substrate 200, substrate 260, and cap 300 can be formed of plastic, nylon, Laser Direct Structuring (LDS) materials, acrylic, or other material or combination of materials. Substrate 200, substrate 260, and cap 300 can be formed by insert or injection molding, 3-D printing, or other technique. In these and other embodiments of the present invention, a subassembly, silicon wafers, printed circuit board, or other structure can be used in place of substrate 200 and substrate 260. These can be formed of ceramic, silicon, printed circuit board material such as FR4, silicon, or other material or combination of materials.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A pressure sensor system comprising:
   a substrate comprising a plurality of layers and having a passage, the passage comprising:
   a first through-hole in a first layer of the substrate;
   a second through-hole in the substrate; and
   a path in a second layer of the substrate and joining the first through-hole to the second through-hole, the substrate having a third layer formed as a solid layer and attached to a side of the second layer opposite the first layer, the third layer is formed of a same material as the first layer and the second layer, the path in a portion of the second layer is formed by removal of all of the second layer between the first layer and the third layer;
   a pressure sensor die attached to the first layer of the substrate over the first through-hole;
   a cap over the pressure sensor die and attached to the substrate, the cap having a first port and a second port, wherein the cap and the substrate form a first chamber and a second chamber in the pressure sensor system, and the first port provides a first path into the first chamber and the second port provides a second path into the second chamber, the first through-hole terminates in the first chamber and the second through-hole terminates in the second chamber, the substrate comprises a raised rib having an outside portion surrounding the first chamber and the second chamber and an inside portion separating the first chamber from the second chamber; and
   a conditioning or processing circuit disposed in the second chamber.

2. The pressure sensor system of claim 1 wherein the pressure sensor die comprises a membrane, and wherein the first through-hole defines a first opening in a top surface of the substrate, the first opening under the membrane of the pressure sensor die.

3. The pressure sensor system of claim 2 wherein the second through-hole is in the first layer of the substrate and defines a second opening in the top surface of the substrate.

4. The pressure sensor system of claim 1 wherein the second layer is attached to the third layer using an adhesive and the first layer is attached to the second layer using an adhesive.

5. The pressure sensor system of claim 1 wherein the first port and the second port each comprise a nozzle.

6. A pressure sensor system comprising:

a substrate comprising a passage from a first opening in a top surface of the substrate to a second opening in the top surface of the substrate, the substrate has a first layer with the first opening and the second opening, a second layer with the passage, and a third layer formed as a solid layer and attached to a side of the second layer opposite the first layer, the third layer is formed of a same material as the first layer and the second layer, the passage in a portion of the second layer is formed by removal of all of the second layer between the first layer and the third layer;

a pressure sensor die attached to the substrate over the first opening;

a cap attached to the substrate such that the pressure sensor die is enclosed by the cap and the substrate, wherein the cap and the substrate form a first chamber and a second chamber in the pressure sensor system, the first opening and the pressure sensor die are in the first chamber, and the second opening is in the second chamber, the substrate comprises a raised rib having an outside portion surrounding the first chamber and the second chamber and an inside portion separating the first chamber from the second chamber; and a conditioning or processing circuit disposed in the second chamber.

7. The pressure sensor system of claim 6 wherein the cap provides access to the first chamber and the second chamber.

8. The pressure sensor system of claim 7 wherein the cap comprises a first nozzle to provide access to the first chamber and a second nozzle to provide access to the second chamber.

9. The pressure sensor system of claim 6 wherein the cap comprises a groove to accept the raised rib on the substrate when the cap is attached to the substrate.

10. The pressure sensor system of claim 6 wherein the substrate is formed of layers of FR4.

11. The pressure sensor system of claim 6 wherein the substrate is formed of layers of ceramic.

12. The pressure sensor system of claim 6 wherein the first layer, the second layer, the third layer, and the raised rib of the substrate are formed of a printed circuit board material.

13. The pressure sensor system of claim 12 wherein the cap is formed of an insulative material different from the printed circuit board material.

* * * * *